(12) United States Patent
Nienhaus et al.

(10) Patent No.: US 10,023,684 B2
(45) Date of Patent: Jul. 17, 2018

(54) UNIVERSAL SPOT BLENDER FOR ONE-COMPONENT AND TWO-COMPONENT CLEARCOATINGS

(75) Inventors: Egbert Nienhaus, Ascheberg (DE); Bernhard Lettmann, Drensteinfurt (DE); Klaus-Udo Reize, Münster (DE); Josef Rademacher, Münster (DE)

(73) Assignee: BASF Coatings GmbH, Münster (DE)

( * ) Notice: Subject to any disclaimer, the term of this patent is extended or adjusted under 35 U.S.C. 154(b) by 912 days.

(21) Appl. No.: 12/667,966

(22) PCT Filed: Jul. 4, 2008

(86) PCT No.: PCT/EP2008/005477
§ 371 (c)(1),
(2), (4) Date: May 4, 2010

(87) PCT Pub. No.: WO2009/007063
PCT Pub. Date: Jan. 15, 2009

(65) Prior Publication Data
US 2010/0216945 A1    Aug. 26, 2010

(30) Foreign Application Priority Data
Jul. 6, 2007    (DE) .................. 10 2007 031 594

(51) Int. Cl.
| C08G 18/08 | (2006.01) |
| C08G 18/67 | (2006.01) |
| C08G 18/79 | (2006.01) |
| C09D 175/16 | (2006.01) |

(52) U.S. Cl.
CPC ......... C08G 18/672 (2013.01); C08G 18/792 (2013.01); C09D 175/16 (2013.01)

(58) Field of Classification Search
CPC ....... C09D 175/16; C08G 18/79; C08G 18/67
USPC ......... 524/589, 590; 427/385.5, 388.2, 388.5
See application file for complete search history.

(56) References Cited

U.S. PATENT DOCUMENTS

| 4,292,350 | A | * | 9/1981 | Kubitza et al. ............ 427/385.5 |
| 4,450,200 | A | | 5/1984 | Iwato et al. |
| 4,456,658 | A | * | 6/1984 | Kubitza et al. ............ 428/424.6 |
| 4,537,926 | A | | 8/1985 | Kivel et al. |
| 4,614,683 | A | | 9/1986 | Barsotti |
| 4,888,124 | A | | 12/1989 | Blum et al. |
| 5,521,272 | A | * | 5/1996 | O'Connor et al. ............ 528/45 |
| 5,739,216 | A | * | 4/1998 | Duecoffre et al. ............ 525/438 |
| 7,491,419 | B2 | * | 2/2009 | Stropp et al. ............ 427/140 |
| 2003/0119979 | A1 | * | 6/2003 | Zander et al. ............... 524/591 |
| 2004/0146638 | A1 | | 7/2004 | Kloeckner et al. |
| 2005/0209433 | A1 | * | 9/2005 | Barsotti et al. ............... 528/176 |
| 2007/0048441 | A1 | | 3/2007 | Braun et al. |

FOREIGN PATENT DOCUMENTS

| DE | 4328092 A1 | 2/1995 |
| DE | 4337961 A1 | 5/1995 |
| DE | 4438504 A1 | 5/1996 |
| DE | 19533168 A1 | 3/1997 |
| DE | 19611849 A1 | 10/1997 |
| DE | 19709467 C1 | 10/1998 |
| DE | 19805421 C1 | 5/1999 |
| DE | 19809643 A1 | 9/1999 |
| DE | 19840605 A1 | 3/2000 |
| DE | 10042152 A1 | 3/2002 |
| DE | 10043810 A1 | 4/2002 |
| DE | 10048670 A1 | 4/2002 |
| DE | 10048847 A1 | 4/2002 |
| DE | 10048849 A1 | 4/2002 |
| DE | 10048275 C1 | 5/2002 |
| DE | 10202565 A1 | 8/2003 |
| DE | 10204114 A1 | 8/2003 |
| DE | 10316890 A1 | 4/2004 |
| DE | 10300798 A1 | 7/2004 |
| DE | 102005012588 A1 | 9/2006 |
| DE | 102005012589 A1 | 9/2006 |
| EP | 0089497 A2 | 9/1983 |
| EP | 0204970 A2 | 12/1986 |
| EP | 0228003 A1 | 7/1987 |
| EP | 0234361 A1 | 9/1987 |
| EP | 0234362 A1 | 9/1987 |
| EP | 0256540 A2 | 2/1988 |
| EP | 0260447 A2 | 3/1988 |
| EP | 0297576 A1 | 1/1989 |
| EP | 0299148 A2 | 1/1989 |
| EP | 0394737 A1 | 10/1990 |
| EP | 0397806 B1 | 11/1990 |
| EP | 0354261 A1 | 12/1990 |
| EP | 0401565 A1 | 12/1990 |
| EP | 0424705 A2 | 5/1991 |
| EP | 0521928 B1 | 1/1993 |
| EP | 0522419 A1 | 1/1993 |
| EP | 0522420 A2 | 1/1993 |
| EP | 0523610 A1 | 1/1993 |
| EP | 0529335 A1 | 3/1993 |
| EP | 0531510 B1 | 3/1993 |
| EP | 0536712 A2 | 4/1993 |
| EP | 0543817 B1 | 6/1993 |
| EP | 0574417 B1 | 12/1993 |
| EP | 0578645 B1 | 1/1994 |
| EP | 0581211 A1 | 2/1994 |
| EP | 0584818 A1 | 3/1994 |
| EP | 0590484 A1 | 4/1994 |
| EP | 0593454 B1 | 4/1994 |
| EP | 0595186 A1 | 5/1994 |
| EP | 0596460 A2 | 5/1994 |

(Continued)

OTHER PUBLICATIONS

International Preliminary Report on Patentability for international application No. PCT/EP2008/005477 dated Feb. 9, 2010.

(Continued)

*Primary Examiner* — Michael L Leonard
(74) *Attorney, Agent, or Firm* — Servilla Whitney LLC

(57) ABSTRACT

The invention relates to binder-free spot blender compositions for one- and two-component clearcoat materials comprising at least one isocyanate compound, to processes for producing them, and to their use in automotive refinish.

20 Claims, No Drawings

(56) References Cited

FOREIGN PATENT DOCUMENTS

| EP | 0596461 A2 | 5/1994 |
|---|---|---|
| EP | 0634431 A1 | 1/1995 |
| EP | 0639660 A1 | 2/1995 |
| EP | 0649865 A1 | 4/1995 |
| EP | 0669356 A1 | 8/1995 |
| EP | 0678536 A1 | 10/1995 |
| EP | 0708788 B1 | 5/1996 |
| EP | 0817684 B1 | 1/1998 |
| EP | 0922720 A1 | 6/1999 |
| GB | 1354783 A * | 6/1974 |
| WO | WO8910387 A2 | 11/1989 |
| WO | WO9411123 A1 | 5/1994 |
| WO | WO9426827 A1 | 11/1994 |
| WO | WO9514721 A1 | 6/1995 |
| WO | WO9612747 A1 | 5/1996 |
| WO | WO9749745 A1 | 12/1997 |
| WO | WO9749747 A1 | 12/1997 |
| WO | WO9958590 A1 | 11/1999 |

OTHER PUBLICATIONS

International Search Report for International Application No. PCT/EP2008/005477 dated Oct. 22, 2008.
Written Opinion of International Application No. PCT/EP2008/005477 International filing date Jul. 4, 2008.

* cited by examiner

UNIVERSAL SPOT BLENDER FOR ONE-COMPONENT AND TWO-COMPONENT CLEARCOATINGS

CROSS REFERENCE TO RELATED APPLICATIONS

This application is a National Phase Application of Patent Application PCT/EP2008/005477 filed on 4 Jul. 2008, which claims priority to DE102007031594.7, filed 6 Jul. 2007, both of which are hereby incorporated by reference in their entirety.

FIELD OF THE INVENTION

The present invention relates to a composition for use as a spot blender for one-component and two-component clearcoat materials. The present invention also relates to a new process for producing said composition. The present invention further relates to the use of said composition as a spot blender in automotive refinish.

BACKGROUND OF THE INVENTION

In automotive refinish, major damage sites are typically treated by removing the damaged parts of the bodywork and refinishing their entire area. In instances of minor damage, which are very annoying particularly in the case of new and/or particularly high-value vehicles, damage of a kind such as key scratches or knocks (for example, from the demarcation in a parking lot), for instance, this procedure is very involved and is out of proportion with the extent of the damage. Minor damage is therefore removed preferably with the aid of methods of minor vehicle refinish. These methods are also referred to by those in the art as touch-up or spot repair.

The known spot repair methods, however, have numerous disadvantages and are difficult to implement. For instance, the runout zones of the clearcoat spray mist on the original finish are often too wide, which makes it more difficult to achieve a visual match between refinish and original finish. Additionally, because of the poor adhesion of the original finish in the runout zones around the damage site, the refinish clearcoat may break away or come off. That produces clearly visible edges which may even run all the way round the refinish clearcoat, which is located directly above the original finish. In that case the overall effect of the refinish, owing to the visually harsh transition zones, is that of a "sticking plaster".

Attempts have been made to solve the problems of the breaking away or coming off and the difficulty of matching the visual qualities in the runout zones by applying what are called spot blenders over the uncured refinish clearcoat. The purpose of this measure is to produce particularly "gentle" transition zones and to prevent the refinish clearcoat coming away in the zones marginal to the original finish.

German patent application DE 100 43 810 A1 discloses a spot repair method with which the sanding and/or polishing times can be lowered by more than 50% as compared with conventional methods. The spot repair binder composition known from DE 100 43 810 A1, however, is suitable only for two-component clearcoat materials based on hydroxyl-containing binders. Other clearcoats, especially one-component clearcoats, cannot be produced by means of the spot repair method of DE 100 43 810 A1.

The German patent application DE 10 2005 012 589 A1, entitled "UV-A-curable, solvent-containing mixture, process for preparing it, and use thereof" discloses a composition consisting of the following constituents:

(A) 1% to 50% by weight of at least one UV-A-curable constituent selected from the group consisting of monomers (a1)) containing at least three UV-A-curable reactive functional groups and at least one isocyanate-reactive functional group and mixtures (a2) of monomers (a21) that are free from isocyanate-reactive functional groups and contain at least two UV-A-curable reactive functional groups, and monomers (a22) that contain at least two UV-A-curable reactive functional groups and at least one isocyanate-reactive functional group;

(B) 0.01% to 10% by weight of at least one colorless or substantially colorless photoinitiator having at least one absorption maximum in the wavelength range of λ=300 to 400 nm;

(C) 10% to 70% by weight of at least one alkyl and/or cycloalkyl acetate having 3 to 10 carbon atoms in the alkyl radical and/or in the cycloalkyl radical;

(D) 10% to 70% by weight of at least one alkoxyalkyl, alkoxycycloalkyl, cycloalkoxyalkyl and/or cycloalkoxycycloalkyl acetate;

(E) 0.001% to 5% by weight of at least one constituent that lowers the interfacial tension; and (F) 0% to 50% by weight of at least one alkylaromatic having at least two alkyl radicals having 1 to 6 carbon atoms in the molecule; and (G) 0% to 50% by weight of at least one additive different from constituents (A) to (F).

A disadvantage of this composition is that, like the composition known from DE 100 43 810 A1, it lacks simultaneous universal suitability for one- and two-component clearcoat materials and, furthermore, after curing under UV irradiation, always still produces slight marginal marks at the polishing edge.

It is an object of the present invention, accordingly, to provide a curable composition to which can be used as a spot blender in spot repair methods and which can be used in combination with one-component and two-component clearcoat materials, preferably without alteration to the constitution of the curable composition. The curable compositions ought preferably to be curable both with UV radiation and thermally, and also by thermal means alone.

The composition to be provided in accordance with the invention ought further, preferably, to make it possible to produce refinishes which within a very short time can be sanded and/or polished, which no longer stand out visually from the original finish, which no longer exhibit any breaking away or coming off in the runout zones, and which are of such high quality that they can also be used for automotive spot repair of original finishes on the production line.

This object is achieved by means of a binder-free spot blender composition for one- and two-component clearcoat materials.

SUMMARY OF THE INVENTION

The binder-free spot blender composition of the invention comprises at least one isocyanate compound. The spot blender composition of the invention is referred to below as "composition of the invention".

The spot blender compositions known from the relevant prior art generally include binder compositions, whereas the spot blender composition of the invention is binder-free.

Additionally provided is a process for producing the composition of the invention by mixing the at least one isocyanate compound, where appropriate, with other constituents of the composition, and homogenizing the resulting mixture.

The present invention further provides compositions which are obtained by means of the process of the invention.

The present invention further provides for the use of the composition of the invention or of the composition produced with the aid of the process of the invention as a spot blender or as a key constituent of spot blenders in spot repair methods.

DETAILED DESCRIPTION OF THE INVENTION

Further subject matter of the invention will become apparent from the description.

In the light of the prior art it was surprising and unforeseeable for the skilled worker that the object on which the present invention was based could be achieved by means of the composition of the invention, the process of the invention, and the inventive use.

In particular it was surprising that the composition of the invention could be employed in its inventive use as a spot blender or as a key constituent of spot blenders in spot repair methods in which not only one-component clearcoat materials but also two-component clearcoat materials are used. Consequently the composition of the invention has a broad utility and—in contrast to the prior art—it is no longer necessary to tailor the respective spot blender composition to one-component or two-component clearcoat materials, respectively.

A particular surprise was that it was possible to add the mixture of the invention as a key constituent to refinish clearcoat materials which could then be used advantageously as spot blenders.

Furthermore, preferably, the composition of the invention makes it possible to provide refinishes which can be sanded and/or polished within a very short time, which no longer stand out visually from the original finish, which do not exhibit breaking away or coming off in the runout zones, and which are of such high quality that they can also be used for automotive spot repair of original finishes on the production line.

The composition of the invention is therefore extraordinarily broadly applicable, and the inventive use produces significant economic advantages on account of the technical advantages for the paint shops and their customers.

Not least, the composition of the invention can be produced economically, by means of the process of the invention, in a simple and extremely reproducible way.

The composition of the invention is curable with a combination of UV-A radiation and thermal irradiation, or with thermal irradiation alone. As is known, UV-A radiation is the UV radiation with a wavelength range, $\lambda$, of 300 to 400 nm. Suitable light sources for UV-A radiation are conventional and are described for example in German patent application DE 103 16 890 A1, page 17, paragraphs [0128] to [0130], or in international patent application WO 94/11123, page 2, line 35 to page 3, line 6; page 3, lines 10 to 15; and page 8, lines 1 to 14.

The mixture of the invention comprises an isocyanate compound. Typical examples of suitable isocyanates are aromatic isocyanates such as 1,5-naphthylene diisocyanate, 2,4- or 4,4'-diphenylmethane diisocyanate (MDI), hydrogenated MDI ($H_{12}$MDI), xylylene diisocyanate (XDI), tetramethylxylylene diisocyanate (TMXDI), 4,4'-diphenyldimethylmethane diisocyanate, di- and tetraalkylenediphenylmethane diisocyanate, 4,4'-dibenzyl diisocyanate, 1,3-phenylene diisocyanate, 1,4-phenylene diisocyanate, and the isomers of tolylene diisocyanate (TDI); aliphatic diisocyanates such as tetramethoxybutane 1,4-diisocyanate, butane 1,4-diisocyanate, hexane 1,6-diisocyanate (HDI), dicyclohexylmethane diisocyanate, cyclohexane 1,4-diisocyanate (CHDI), ethylene diisocyanate, bisisocyanatoethyl phthalate, 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (isophorone diisocyanate, IPDI); fluorinated, chlorinated, and brominated diisocyanates, phosphorus-containing diisocyanates such as 4,4'-diisocyanatophenylperfluoroethane, and also diisocyanates containing reactive halogen atoms, such as 1-chloromethylphenyl 2,4-diisocyanate, 1-bromomethylphenyl 2,6-diisocyanate, and 3,3-bischloromethyl ether 4,4'-diphenyl diisocyanate.

Particularly preferred in the context of the present invention is the use of 1-isocyanatomethyl-3-isocyanato-1,5,5-trimethylcyclohexane (isophorone diisocyanate, IPDI).

Polyisocyanates as well can be used in the context of the present invention. Examples of suitable polyisocyanates are described in German patent application DE 100 48 670 A1, page 5, paragraph [0058] to page 6, paragraph [0064], or in German patent application DE 103 16 890 A1, page 14, paragraph [0105] to page 15, paragraph [0106], and page 15, paragraphs [0108] and [0109].

Sulfur-containing polyisocyanates can be used as well, and are obtained, for example, by reacting 2 mol of hexamethylene diisocyanate with 1 mol of thiodiglycol or dihydroxydihexyl sulfide. Examples of further diisocyanates which can be used include trimethylhexamethylene diisocyanate, 1,4-diisocyanatobutane, 1,12-diisocyanatododecane, and dimer fatty acid diisocyanate. Also suitable are the following: tetramethylene, hexamethylene, undecane, dodecamethylene, 2,2,4-trimethylhexane, 2,3,3-trimethylhexamethylene, 1,3-cyclohexane, 1,4-cyclohexane, 1,3- and 1,4-tetramethylxylene, isophorone, 4,4-dicyclohexylmethane, tetramethylxylylene (TMXDI), and lysine ester diisocyanates.

Suitable at least trifunctional isocyanates are polyisocyanates which are formed by trimerization or oligomerization of diisocyanates or by reaction of diisocyanates with polyfunctional hydroxyl- or amino-containing compounds. A suitable example from the group of the aromatic polyisocyanates is methylenetriphenyl triisocyanate (MIT).

Isocyanates suitable for the preparation of trimers are the aforementioned diisocyanates, particular preference being given to the trimerization products of the isocyanates HDI, MDI or IPDI.

In accordance with the present invention it is possible for the diisocyanate or polyisocyanate used to be what is called an encapsulated or surface-deactivated diisocyanate or polyisocyanate, in other words a diisocyanate or polyisocyanate with retarded reactivity. Encapsulated or surface-deactivated diisocyanates and polyisocyanates are familiar to the skilled worker from the prior art. Reference may be made, for example, to EP 0 204 970 A2 or the corresponding U.S. Pat. No. 4,888,124, to WO 99/58590 A1 or else to EP 0 922 720 A1, the disclosure content of which is hereby incorporated by reference. The surface deactivation can be accomplished, for example, by dispersing a solid, powder-form isocyanate in a solution of the deactivating agent, by introducing a melt of a low-melting isocyanate into a solution of the deactivating agent in a nonsolvent liquid dispersion medium, or else by adding the deactivating agent or a solution of said agent to a dispersion of the solid, finely divided polyisocyanates, or vice versa. Deactivating agents used are, more particularly, compounds having hydrophilic groups, such as amino groups or hydroxyl groups in particular, which are able to react with free isocyanate groups of the isocyanate and so to form a kind of surface shell on the isocyanates which initially deactivate the isocyanates (e.g., amines, diamines, polyamines, alcohols, diols, polyols or the corresponding thio compounds). For the purposes of the present invention the deactivating agent is selected in particular, in its nature and amount, in such a way that the encapsulation or surface deactivation is broken preferably at temperatures above room temperature, in particular at temperatures between 60° C. and 160° C.

Likewise suitable for use are the polymeric isocyanates of the kind obtained, for example, as a residue in the liquid phase in the distillation of diisocyanates. Particularly suitable in this context is the polymeric MDI obtainable from the residue from the distillation of MDI.

One preferred embodiment of the invention, for example, uses Desmodur N 3300, Desmodur N 100, Desmodur XP 2565 or the IPDI trimer Isocyanurate T 1890 (manufacturer: Bayer AG).

When selecting the polyisocyanates it should be ensured that the NCO groups of at least one polyisocyanate possess different reactivities with respect to compounds carrying isocyanate-reactive functional groups. This applies in particular to diisocyanates containing NCO groups in different chemical environments, in other words to asymmetric diisocyanates.

As at least one isocyanate compound it is preferred to use a trimerization product of a diisocyanate, since these products have a low viscosity and a low toxicological hazard potential. Uretdiones, however, can also be used. Particular preference is given to using HDI trimers and/or IPDI trimers.

The concentration of the isocyanate compound in the composition of the invention is not subject to any particular restriction. It has, however, been found preferable for the concentration of the isocyanate constituent in the composition of the invention to be 2% to 30%, preferably 5% to 25%, more preferably 10% to 15% by weight.

The composition of the invention may further comprise at least one thermally curable reactive diluent and a reactive diluent activable with actinic radiation.

The two kinds of reactive diluent may also serve as solvents and/or dispersion media for the other constituents of the composition of the invention.

Examples of suitable thermally curable reactive diluents are positionally isomeric diethyloctanediols or hydroxyl-containing hyperbranched compounds or dendrimers, as described in patent applications DE 198 09 643 A 1, DE 198 40 605 A 1 or DE 198 05 421 A 1.

Examples of suitable reactive diluents curable with actinic radiation are described in Römpp Lexikon Lacke and Druckfarben, Georg Thieme Verlag, Stuttgart, New York, 1998, on page 491 under the entry heading "Reactive diluents". Also suitable, furthermore, are vinylaromatics, more particularly styrene.

As a reactive diluent the composition of the invention may further be admixed with a hydroxy-containing acrylate. One preferred suitable reactive diluent in this context is dipentaerythritol hexaacrylate, which has an OH number of approximately 100.

The proportion of the reactive diluents in the composition of the invention may vary very widely and is in principle not subject to any particular restriction. Preferably they are present in the composition of the invention in an amount of 1% to 10% by weight, preferably 2% to 5% by weight, based in each case on the composition of the invention.

The composition of the invention may further comprise at least one organic solvent. The selection of suitable organic solvents is not subject to any particular restriction, and in principle it is possible to use any organic solvent. As solvents the compositions of the invention may comprise customary solvents, such as aromatic aliphatic, araliphatic or cycloaliphatic hydrocarbons, partly or fully halogenated aromatic aliphatic, araliphatic or cycloaliphatic hydrocarbons, alcohols such as methanol, ethanol, isopropanol, butanol, benzyl alcohol, and diacetone alcohol, esters such as ethyl acetate, propyl acetate, n-butyl acetate, and isobutyl acetate, ether esters such as methoxypropyl acetate or butylglycol acetate, ketones such as acetone, methyl ethyl ketone, methyl isobutyl ketone or cyclohexanone, strongly polar solvents such as dimethylformamide and water, and mixtures thereof. Suitable solvents further include ethylene glycol monomethyl or monoethyl ether acetate, 1-methoxy-prop-2-yl acetate, 3-methoxy-n-butyl acetate, 2-butanone, 4-methyl-2-pentanone, methyl ethyl ketone, cyclohexanone, toluene, xylene, chlorobenzene, white spirit, mixtures which in particular contain aromatics with relatively high degrees of substitution, of the kind in commerce, for example, under the names Solvent Naphtha, Solvesso® (Deutsche Exxon, Cologne, DE), Cypar® (Shell, Eschborn, DE), Cyclo Sol® (Shell, Eschborn, DE), Tolu Sol® (Shell, Eschborn, DE), Shellsol® (Shell, Eschborn, DE), carbonic esters, such as dimethyl carbonate, diethyl carbonate, 1,2-ethylene carbonate, and 1,2-propylene carbonate, lactones, such as β-propiolactone, γ-butyrolactone, ε-caprolactone, and ε-methylcaprolactone, and also solvents such as propylene glycol diacetate, diethylene glycol dimethyl ether, diethylene glycol ethyl and butyl ether acetate, and N-methylcaprolactam, or any desired mixtures of such solvents.

Particular preference is given to using n-butyl acetate, isobutyl acetate and/or xylene.

The composition of the invention may further comprise at least one additive. The selection of suitable additives is not subject to any particular restriction and it is possible in principle to use any additive.

Examples of suitable additives are conventional color and/or effect pigments, fillers, nanoparticles, crosslinking agents, UV absorbers, light stabilizers, free-radical scavengers, free-radical polymerization initiators, thermal crosslinking catalysts, slip additives, polymerization inhibitors, defoamers, emulsifiers, degassing agents, wetting agents, dispersants, adhesion promoters, flow control agents, film-forming assistants, rheology control additives (thickeners), flame retardants, siccatives, dryers, antiskinning agents, corrosion inhibitors, waxes, and matting agents, as are known from the textbook "Lackadditive" [Additives for coatings] by Johan Bieleman, Wiley-VCH, Weinheim, New York, 1998.

The concentration of the additives in the composition of the invention is not subject to any particular restriction and may vary from one additive to another. It has nevertheless emerged as being preferred for the concentration of the additive constituent in the composition of the invention to be 0.1% to 6%, preferably 0.3% to 1% by weight.

Another advantage of the compositions of the invention is that they can be produced with a very high solids fraction. Hence the production of compositions with a low VOC fraction is made possible. The compositions of the invention may have a solids fraction of 5% to 100%, preferably 40% to 60% by weight.

The composition of the invention is preferably produced by means of the process of the invention. The process of the invention involves mixing the above-described constituents, if present, with one another, and then homogenizing the resulting mixture. Preference is given in this context to using the conventional mixing techniques and apparatus such as stirred tanks, agitator mills, extruders, compounders, Ultraturrax, inline dissolvers, static mixers, micromixers, toothed-wheel dispersers, pressure-release nozzles and/or microfluidizers, preferably in the absence of actinic radiation.

The composition of the invention may serve per se for numerous end-use applications. In particular, in the context of its use in accordance with the invention, it is employed as a spot blender in a spot repair method or for producing such a spot blender.

The spot repair method of the invention encompasses the following steps:
(1) cleaning the damage site and its surroundings,
(2) sanding and recleaning the damage site,
(3) if desired, filling, sanding and cleaning the damage site,
(4) applying a surfacer and flashing off the resulting surfacer film, or alternatively curing the surfacer film and sanding and cleaning the resultant surfacer coat,
(5) applying a basecoat material to the surfacer film or surfacer coat, flashing off the resulting basecoat film and removing any overspray,
(6) applying a clearcoat material wet-on-wet to the basecoat film,
(7) applying the spot blender composition of the invention, and
(8) curing the applied films.

For the spot repair method of the invention it is advantageous for the basecoat material to be applied hidingly by pneumatic application, using a spray gun, from the outside, i.e., from the original finish, toward the inside, i.e., toward the center of the damage site. Additionally it is important for the spot blender used to be the composition of the invention described in detail above.

For the pneumatic application of the coating materials it is possible to use spray guns that are conventional per se. In accordance with the invention, alternatively, it is advantageous to use smaller spray guns than the conventional spray guns.

Small-sized spray guns of this kind are available from SATA, Kornwestheim, under the trade name SATA minijet 2 HVLP SR (spot repair).

For the cleaning and the sanding it is possible to use the cleaning equipment, cleaning fluids, and sanding and/or polishing devices of the kind that are customarily used for automotive refinishing.

For the filling it is possible to employ conventional knifing fillers, especially UV-curable knifing fillers, such as those from BASF Coatings AG.

Suitable surfacers include conventional aqueous and solventborne surfacers, such as are described for example in patents and patent applications U.S. Pat. No. 4,537,926 A, EP 0 529 335 A 1, EP 0 595 186 A 1, EP 0 639 660 A 1, DE 44 38 504 A 1, DE 43 37 961 A 1, WO 89/10387, U.S. Pat. No. 4,450,200 A, U.S. Pat. No. 4,614,683 A or WO 94/26827. It is also possible to use UV-curable surfacers.

The surfacers are commercially customary products, which are sold for example by BASF Coatings AG under the brand name Glasurit® 1K-Grundfüller [one-component primer-surfacer] 76-71.

Examples of suitable solventborne or aqueous basecoat materials are known from patent applications EP 0 089 497 A 1, EP 0 256 540 A 1, EP 0 260 447 A 1, EP 0 297 576 A 1, WO 96/12747, EP 0 523 610 A 1, EP 0 228 003 A 1, EP 0 397 806 A 1, EP 0 574 417 A 1, EP 0 531 510 A 1, EP 0 581 211 A 1, EP 0 708 788 A 1, EP 0 593 454 A 1, DE-A-43 28 092 A 1, EP 0 299 148 A 1, EP 0 394 737 A 1, EP 0 590 484 A 1, EP 0 234 362 A 1, EP 0 234 361 A 1, EP 0 543 817 A 1, WO 95/14721, EP 0 521 928 A 1, EP 0 522 420 A 1, EP 0 522 419 A 1, EP 0 649 865 A 1, EP 0 536 712 A 1, EP 0 596 460 A 1, EP 0 596 461 A 1, EP 0 584 818 A 1, EP 0 669 356 A 1, EP 0 634 431 A 1, EP 0 678 536 A 1, EP 0 354 261 A 1, EP 0 424 705 A 1, WO 97/49745, WO 97/49747, EP 0 401 565 A 1 or EP 0 817 684, column 5, lines 31 to 45.

Use may also be made of the basecoat materials based on the mixer system that is described in European patent application EP 0 578 645 A 1.

The basecoat materials are commercially customary products, which are sold for example by BASF Coatings AG under the brand names Glasurit® Decklack-Reihe [topcoat series] 55 with Glasurit® Einstellenzusatz [standardizer additive] 352-91 or Glasurit® Decklack-Reihe 90 with Glasurit® Einstellenzusatz 93-E 3 and Glasurit® Beispritzlack [blending varnish] 90-M5 in accordance with European patent application EP 0 578 645 A 1.

It is a very particular advantage of the composition of the invention and of its use in accordance with the invention that as part of the spot repair method of the invention it is possible to use refinish clearcoat materials that are
  curable physically,
  curable thermally,
  curable with actinic radiation, preferably with UV radiation, in particular with UV-A radiation, or
  curable by a dual-cure mechanism,
preferably refinish clearcoat materials that are curable with UV-A radiation or both thermally and with UV-A radiation (dual cure).

For the purposes of the present invention the term "physical curing" denotes the curing of a film of a refinish clearcoat material by film formation, with linking within the film taking place via looping of the polymer molecules of the binders that are present. Alternatively film formation takes place via the coalescence of binder particles (cf. Römpp Lexikon Lacke and Druckfarben, Georg Thieme Verlag, Stuttgart, New York, 1998, "curing", pages 274 and 275). Thus the physical curing and also where appropriate the curing of the refinish clearcoat materials may be assisted by means of heat or by means of exposure to actinic radiation.

The thermally curable refinish clearcoat materials may be self-crosslinking and/or externally crosslinking.

For the purposes of the present invention the term "self-crosslinking" refers to the capacity of a binder that is present in the refinish clearcoat material (regarding the term "binder" cf. Römpp Lexikon Lacke und Druckfarben, Georg Thieme Verlag, Stuttgart, New York, 1998, "binders", pages 73 and 74) to undergo crosslinking reactions with itself. A precondition for this is that the binders already include both kinds of complementary reactive functional groups which are necessary for crosslinking, or reactive functional groups which react "with themselves".

Externally crosslinking refinish clearcoat materials, on the other hand, are those in which one kind of the complementary reactive functional groups is present in the binder and the other kind is present in a curing or crosslinking agent. For further details of this, refer to Römpp Lexikon Lacke und Druckfarben, Georg Thieme Verlag, Stuttgart, New York, 1998, "curing", pages 274 to 276, especially page 275, bottom. Examples of suitable complementary reactive functional groups are known from patent application DE 100 42 152 A1, page 7, paragraph [0078], to page 9, paragraph [0081].

The refinish clearcoat materials may also be curable only with actinic radiation. In that case curing takes place via the above-described groups which contain bonds which can be activated with actinic radiation.

The refinish clearcoat materials are preferably curable thermally and with actinic radiation.

Examples of suitable UV-curable refinish clearcoat materials are known from German patent DE 197 09 467 C 1.

The dual-cure refinish clearcoat materials are preferably prepared from multicomponent systems, especially two-component systems, which comprise polyisocyanates as curing agents. Examples of suitable dual-cure refinish clearcoat materials are known from German patent applications DE 103 16 890 A1, DE 103 00 798 A1, DE 102 02 565 A1, DE 100 42 152 A1, DE 102 04 114 A1, DE 100 48 847 A1, DE 100 48 849 A1, DE 100 48 275 A1 or DE 100 48 670 A1. One example of an especially suitable dual-cure refinish clearcoat material is that prepared from the multi-component system, sold by BASF Coatings AG, that includes 2K [two-component] UVA clearcoat, Glasurit® VOC-Decklack-Härter [VOC topcoat hardener] code 929-31 and Glasurit® standardizer additive 352-91.

A further very particular advantage of the composition of the invention and of its use in accordance with the invention is that as part of the spot repair method of the invention the composition of the invention can be added to each of the refinish clearcoat materials used, and then the resultant mixtures can in turn be employed as spot blenders. This results in outstanding adhesion of the spot blender to the refinishes and to the original finishes.

The thermal curing of the coating materials that are applied in the spot repair method of the invention and of the applied composition of the invention has no peculiarities but instead takes place with conventional apparatus, such as fan heaters and radiant heaters which emit near and far infrared. The temperatures employed and the duration of heating are guided by the requirements of the case in hand, in particular by the reactivity of the thermally curable constituents, and can easily be selected and adjusted by the skilled worker on the basis of his or her general art knowledge and skill in the art.

The curing of the dual-cure refinish clearcoat materials that are applied in the spot repair method of the invention and of the applied composition of the invention with UV-A radiation likewise has no special features but instead takes place using the conventional light sources as described at the outset. Shadow zones can be exposed using aluminum foils as mirrors or reflectors. The duration of exposure and the irradiated dose are guided by the requirements of the case in hand, in particular by the reactivity of the UV-A-curable constituents, and can easily be selected and adjusted by the skilled worker on the basis of his or her general art knowledge and skill in the art.

The UV-A light sources may be conventionally provided with filters, so that the applied dual-cure refinish clearcoat materials can be cured in alternation with IR radiation, i.e., thermally, and with UV-A radiation.

The spot repair method of the invention is suitable in particular for the spot repair of damage up to 4 to 5 cm in diameter. The damage site should be free from deformations such as dents, scratches or stonechips. Spot repair on vertical surfaces is particularly advisable. In the case of horizontal surfaces, the spot repair method is employed advantageously in the vicinity of edges (at a distance of up to 15 cm).

The use in accordance with the invention and the spot repair method of the invention yield refinishes that can be sanded and/or polished within a very short time, that no longer stand out visually from the original finish, that no longer exhibit any coming off or breaking away in the runout zones, and that are of such high quality that they can be used even for spot repair of original finishes on the production line.

A complete surprise here is the outcome whereby, by virtue of the use in accordance with the invention and the spot repair method of the invention, it is possible completely to avoid matting and similar paint defects of refinish basecoats which contain platelet-shaped aluminum effect pigments.

The present invention is illustrated with reference to the examples below, which do not, however, restrict the present invention.

EXAMPLES

Example 1

Preparation of Inventive Composition

In a suitable stirred vessel, in the absence of actinic radiation, 18 parts by weight of xylene, 23 parts by weight of isobutyl acetate, 43.5 parts by weight of n-butyl acetate, 12.0 parts by weight of trimeric isophorone diisocyanates, 3 parts by weight of 1-methoxy-2-propyl acetate, 0.2 part by weight of dibutyltin dilaurate, 0.2 part by weight of BYK®-358 N (acrylate copolymer), and 0.1 part by weight of BYK®-340 (polymeric fluorosurfactant) were mixed with one another and the resulting mixture was homogenized. The resulting composition 1 could without problems be stored in the absence of actinic radiation, and transported to the users. It was outstandingly suitable as a spot blender for spot repair methods employing a very wide variety of refinish clearcoat materials.

Example 2

Automotive Spot Repair

Paint Damage:
The damage site for repair was a 4 to 5 cm long scratch in an automobile door with a silver metallic finish, the scratch having been caused by a key and extending in places right down to the substrate.
Actions:
The apparatus, materials and steps indicated below were applied in the order stated.
Cleaning:
1. spray can with Teroson® intensive screen cleaner
2. finish control spray 55535 from 3M
3. spray bottle with nitro thinner M600 from Akzo
4. Kimberley Clark Classic® cleaning cloths
Sanding:
Lackpfeile® paint file
Schleifblüte® P 1500 sanding pad from 3M
Filling:
knifing filler from BASF Coatings AG
flash-off time: 10 minutes/20° C.
sanding: wet (spray bottle) with Schleifblüte® P 1000 sanding pad from 3M
Masking:
paper and masking tape from 3M
Basecoat:
Glasurit® two-coat topcoat 90 line with silver-metallic effect from BASF Coatings AG
spray gun: SATA minijet 2 HVLP SR; spray pressure: 1.5 bar damage site is sprayed hidingly from the outside toward the center, running out extensively into the surrounding area flashing off: two to three minutes after each spraying operation wiping with dust-binding cloth UV-A-Curable Clearcoat:

Glasurit® 2K UVA clearcoat and Glasurit® VOC topcoat hardener code 929-31 in a 2:1 ratio+10% Glasurit® standardizer additive 352-91 spray gun: SATA minijet 2 HVLP SR; spray pressure: 1.5 bar damage site is sprayed from the outside toward the center, running out extensively in two spray operations into the surrounding area flashing off: two to three minutes after each spraying operation UV-A-Curable Spot Blender:

composition 1 from example 1 spray gun: SATA minijet 2 HVLP SR; spray pressure: 1.5 bar spot blender sprayed over the runout zones of the clearcoat Curing:

In Succession:
1. UVA lamp: Panacol 900 (distance: 20 cm; duration: approximately 90 seconds), 5 minutes of IR radiation and then approximately 4000 mJ/cm² UVA radiation
2. Combination lamp: Panacol 900 or INP (distance: 20 cm, duration: 5 minutes), 5 minutes of IR during the last 90 seconds of UVA (approximately 4000 mJ/cm²)

The resultant refinish was polishable immediately, being very easy to polish, and its visual and mechanical match with the original finish was outstanding. No matting or other paint defects were observed.

What is claimed is:

1. A spot blender composition for one- and two-component clearcoat materials comprising
    at least one di- or polyisocyanate compound in a concentration of 2-30 wt %,
    at least one organic solvent,
    wherein the spot blender composition is binder-free and is devoid of a hydroxyl functional compound.

2. The spot blender composition of claim 1, wherein the di- or polyisocyanate compound comprises an aromatic isocyanate selected from the group consisting of 1,5-naphthylene diisocyanate, 2,4- or 4,4'-diphenylmethane diisocyanate (MDI), hydrogenated MDI (H12MDI), xylylene diisocyanate (XDI), tetramethylxylylene diisocyanate (TMXDI), 4,4' diphenyldimethylmethane diisocyanate, di- and tetraalkylenediphenylmethane diisocyanate, 4,4'-dibenzyl diisocyanate, 1,3-phenylene diisocyanate, 1,4-phenylene diisocyanate, and the isomers of tolylene diisocyanate (TDI).

3. The spot blender composition of claim 1, wherein the di- or polyisocyanate compound comprises an aliphatic isocyanate selected from the group consisting of tetramethoxybutane 1,4-diisocyanate, butane 1,4-diisocyanate, hexane 1,6-diisocyanate (HDI), dicyclohexylmethane diisocyanate, cyclohexane 1,4-diisocyanate (CHDI), ethylene diisocyanate, bisisocyanatoethyl phthalate, 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyckohexane (isophorone diisocyanate, IPDI); fluorinated diisocyanates, chlorinated diisocyanates, brominated diisocyanates, phosphorus-containing diisocyanates, and diisocyanates containing reactive halogen atoms.

4. The spot blender composition of claim 1, wherein the di- or polyisocyanate compound comprises a trimerization product of a diisocyanate.

5. The spot blender composition of claim 4, wherein the di- or polyisocyanate compound comprises at least one of an HDI trimer, an IPDI trimer, and combinations thereof.

6. The spot blender composition of claim 1, wherein the solvent comprises at least one member selected from the group consisting of n-butyl acetate, isobutyl acetate, and xylene.

7. The spot blender composition of claim 1, comprising a solids fraction of from 5% to 100% by weight.

8. A process for producing a composition of claim 1, comprising mixing the constituents of the composition with one another and homogenizing the resulting mixture.

9. A method of repairing an automotive finish, comprising employing the composition of claim 1 as a spot blender in automotive spot repair.

10. The method of claim 9, wherein composition of claim 1 is added to a refinish clearcoat material, after which the resulting mixture is employed as a spot blender.

11. The spot blender composition of claim 3, wherein the di- or polyisocyanate compound comprises an aliphatic isocyanate is at least one of 4,4' diisocyanatophenylperfluoroethane, 1-chloromethylphenyl 2,4-diisocyanate, 1-bromomethylphenyl 2,6-diisocyanate, or 3,3-bischloromethyl ether 4,4'-diphenyl diisocyanate.

12. The spot blender composition of claim 1, further comprising an acrylate polymer, which is devoid of a hydroxyl functional group.

13. The spot blender composition of claim 12, wherein the acrylate polymer is an acrylate copolymer.

14. A spot blender composition for one- and two-component clearcoat materials comprising at least one di- or polyisocyanate compound in a concentration of 2-30 wt % and a reactive diluent that is at least one of a thermally curable reactive diluent, a reactive diluent activable with actinic radiation or a combination thereof; wherein the at least one di- or polyisocyanate compound comprises a trimerization product of a diisocyanate, the spot blender composition being binder-free and devoid of a hydroxyl functional compound.

15. The spot blender composition of claim 14, wherein the reactive diluent comprises an acrylate polymer, which is devoid of a hydroxyl functional group.

16. The spot blender composition of claim 15, wherein the acrylate polymer is an acrylate copolymer.

17. The spot blender composition of claim 14, comprising the reactive diluent in an amount of from 1% to 10% by weight.

18. The spot blender composition of claim 1, wherein the spot blender composition consists essentially of the at least one di- or polyisocyanate and the at least one organic solvent.

19. The spot blender composition of claim 1, wherein application of the spot blender composition to a clearcoat material and curing is effective for spot repair with both one- and two-component clearcoat materials.

20. The spot blender composition of claim 14, wherein application of the spot blender composition to a clearcoat material and curing is effective for spot repair with both one- and two-component clearcoat materials.

* * * * *